May 28, 1929.　　K. F. GALLIMORE ET AL　　1,714,555
WORKHOLDER
Original Filed July 25, 1924
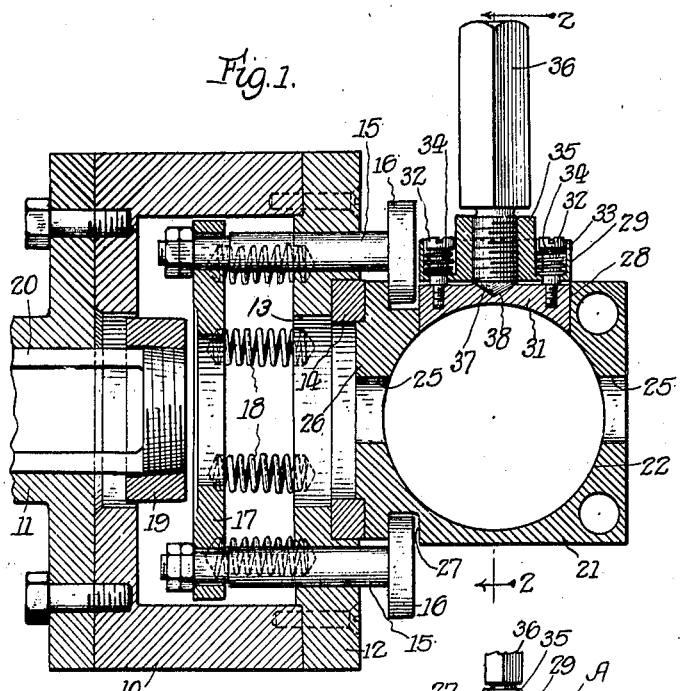
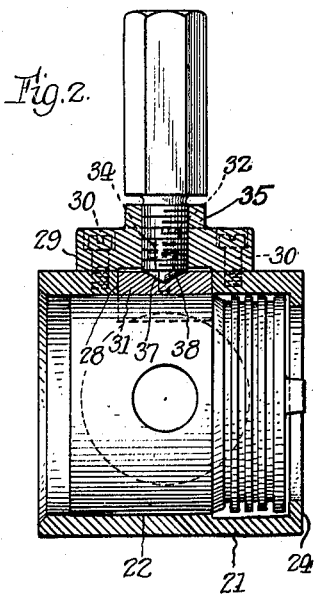
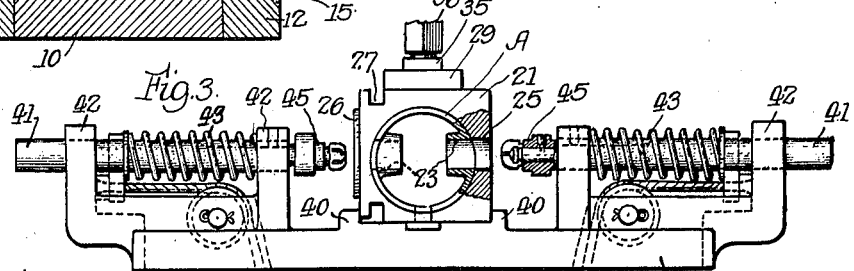
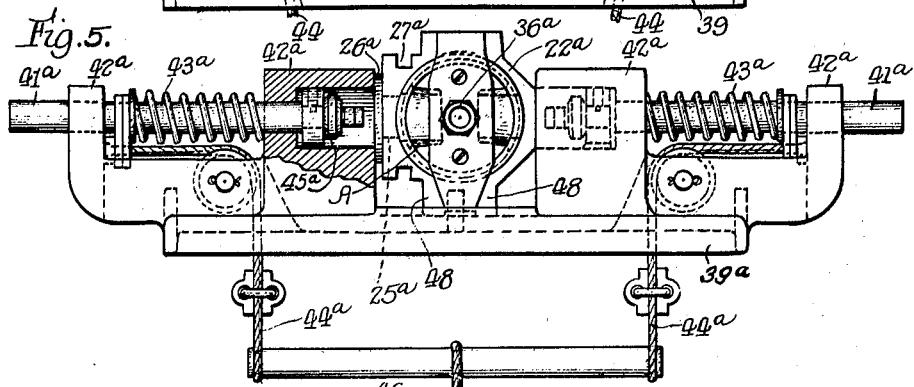
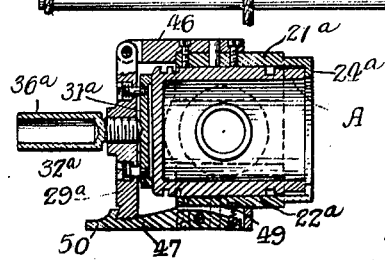
Inventors:
Keith F. Gallimore,
Raymond M. Woylych, Patented May 28, 1929.

1,714,555

UNITED STATES PATENT OFFICE.

KEITH F. GALLIMORE AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS.

WORKHOLDER.

Application filed July 25, 1924, Serial No. 728,116. Renewed October 11, 1928.

Our invention relates to improvements in work holding devices for machine tools; and has reference more especially to a portable shuttle adapted to be removably clamped into a machine chuck with the work to be machined located in centered position.

The primary object of our invention resides in the provision of a work shuttle which is constructed to hold cylindrical or irregular parts, such as automobile pistons, having transverse bores or surfaces to be machined terminating in their uneven or curved peripheries; and in which the parts can be quickly and accurately located and clamped in position.
A further object is to provide a shuttle of the above character in which the work piece is precisely located angularly and longitudinally in a simple manner, and more particularly in which the clamping means serves to locate the work piece longitudinally.

Other objects and advantages will become apparent as the description proceeds.

In the accompanying drawings, Figure 1 is a sectional view of a shuttle embodying the features of our invention clamped in position to a chuck of suitable construction.

Fig. 2 is a longitudinal sectional view taken along line 2—2 of Fig. 1 of the shuttle.

Fig. 3 is a side view of a loading fixture with the shuttle mounted thereon to locate the work piece.

Fig. 4 is a longitudinal sectional view of another form of shuttle constructed according to our invention.
Fig. 5 is a side view of a loading fixture with the shuttle shown in Fig. 4 positioned thereon.

While we have shown in the drawings and will herein describe in detail, the preferred embodiment of our invention, it is to be understood that we do not thereby intend to limit the invention to the specific forms disclosed, but aim in the appended claims to cover all modifications and alternative constructions falling within the spirit and scope of the invention.

Referring to the drawings, we have shown a chuck of suitable construction for holding the shuttle in the machine tool with the part to be machined properly positioned relative to the axis of rotation. In the present instance, the chuck comprises a hollow cylindrical body 10 removably secured to a rotatable spindle 11, and closed at the front by a face plate 12. The face plate 12 is provided with an axial opening 13, and with a centering bushing 14 mounted in the front surface concentric with the axis of rotation. A pair of diametrically opposite clamping members 15 are slidably mounted in the plate 12, and are provided with large circular heads 16 at their outer ends movable toward and from the bushing 14. The inner ends of the clamping members 15 carry a floating disc 17 which is pressed rearwardly by a plurality of coiled springs 18, and can be moved forwardly by a nut 19 on the front end of a suitable push rod 20. The chuck herein shown and described is not, however, our invention but is made the subject matter of a separate application of Kempton, Gallimore and Woytych, Serial No. 721,172, filed June 20, 1924.

In the exemplary form of our invention illustrated in Figs. 1 to 3, 21 represents the body of the shuttle which is provided with a longitudinal bore 22 adapted to snugly receive the work piece. While the shuttle can be adapted for work pieces of various shapes and forms, it is primarily intended for pieces having bores or surfaces to be ground terminating in curved or uneven surfaces which render centering and clamping difficult, and we have therefore shown it as constructed to hold an automobile piston A having transverse wrist pin holes 23 to be finished. The body 21 is also provided with an annular shoulder 24 at the rear end of the bore 22 to limit the inner position of the blank A and roughly locate it endwise, and with a pair of alined holes 25 in two opposite side walls with which the wrist pin holes 23 must register. One side of the body is formed with a centering pilot or ring 26 concentric with the holes 25 and adapted to fit into the bushing 14 to center the holes 25 relative to the axis of rotation, and with a pair of notches 27 adapted to receive the heads 16 for clamping the shuttle in position.

One wall of the body 21 is provided with a rectangular hole 28 extending transversely of the holes 25. The hole 28 is closed by a clamp plate or support 29 secured to the body 21 by a plurality of screws 30. Mounted on the plate 29 for movement in the hole 28 is a clamp or block 31 having an inner cylindrical surface conforming to and adapted to engage the periphery of the work piece. The clamp 31 is supported by a pair of shoulder screws 32 extending outwardly through the plate 29 into depressions 33 formed at opposite sides of the latter. The screws 32 are pressed outwardly to withdraw the clamp 31 from the work piece by a pair of coiled springs 34 located in the depression 33. Extending through a tubular projection 35 on the plate 29 is an adjusting or clamping screw 36 having a pointed end 37 fitting into a corresponding depression 38 in the outer surface of the clamp 31.

In loading the shuttle, a piston A is placed in the bore 22 so as to bring the inner end against the shoulder 24 and the wrist pin holes 23 into approximate alinement with the holes 25, thereby roughly locating the blank. To accurately center the holes 23, the shuttle is preferably positioned on a suitable loading fixture 39, as shown in Fig. 3. In the instant case, the fixture 39 comprises a plurality of guides 40 for properly locating the shuttle, and a pair of alined rods 41 slidably mounted in upstanding ears 42 at opposite sides of the guides 40. The rods 41 are pressed apart by coiled springs 43 and can be moved simultaneously toward each other by a suitable cord 44; and are provided with centering plugs or noses 45 adapted to pass through the holes 25 into engagement with the wrist pin holes 23. This serves to locate the piston A correctly endwise and angularly in the shuttle. Preferably the plugs 45 are split to provide yielding ends which serve to easily aline the holes 23 with the holes 25 even though the former have been machined unevenly or inaccurately. Since the piston A fits closely in the bore 22, it can be clamped in position by adjusting the screw 36 to move the block 31 inwardly.

Referring to Figs. 4 and 5 wherein we have shown another form of our invention, the body of the shuttle and the means for supporting and actuating the clamp are constructed as in the first form described, and the corresponding parts are therefore designated by the same numerals with the subscript $a$ added. The bore $22^a$ is made with a diameter large enough to receive the piston A freely, and the annular shoulder $24^a$ serves to accurately locate the piston endwise.

Secured to one side of the body $21^a$ is a forwardly extending hinge bracket 46 on which the clamping plate $29^a$ is pivotally mounted. The plate $29^a$ can be moved into a position directly across the front end of the bore $22^a$, and is adapted to be retained in such position by a latch 47 pivotally mounted between two lugs 48 opposite the bracket 46. The latch 47 is held against the end of the plate $29^a$ by a small spring 49, and is provided with a catch 50 adapted to be slipped over the end of the plate $29^a$ when the latter is moved into clamping position. When the plate $29^a$ is in closed position, the clamp $31^a$ is adapted to engage the end of the piston A.

Where the ends of the work pieces are accurately machined, as pistons usually are, they can be located endwise in the shuttle by being clamped tightly against the shoulder $24^a$. Angular location is effected by means of a centering fixture $39^a$ which is substantially like that shown in Fig. 3, the corresponding parts being indicated by similar reference numerals with the subscript $a$ added. In this form, the inner ears $42^a$ serve to locate the shuttle on the fixture and the plugs $45^a$ which are of a special design are slidably mounted in said ears for movement into and out of the holes $25^a$ to locate the piston A angularly.

It will be seen that we have provided a novel and efficient work holder, which is simple in construction, easy and quick to load and unload, and which serves to support irregular and unwieldly parts accurately in position to be machined. The method employed in loading these parts allows the operator to reload one shuttle while another shuttle with a work piece is mounted in the chuck, thereby increasing the output of the machine and utilizing the time of the operator during the actual machine operation.

We claim as our invention:

1. A work holder comprising, in combination, a body provided with a bore and with a pair of alined holes extending transversely into opposite sides of said bore, a flange formed at one end of said bore, a centering ring formed integral with one side of said body and concentric with said holes, a support secured to said body, a clamping plate yieldingly mounted on said support and positioned to engage a work blank in said bore, and means for actuating said clamp.

2. A work holder comprising, in combination, a body provided with a longitudinal bore and a pair of transverse holes opening into opposite sides of said bore, a centering flange formed on one side of said body concentric with said holes, a clamp positioned to engage a work blank in said bore, spring means for moving said clamp outwardly away from the blank, and means for moving said clamp inwardly to engage the blank.

3. A work holder having, in combination, a body provided with a longitudinal bore and with a transverse hole opening into one side of said bore, an annular shoulder formed on said body at one end of said bore, a support secured to said body, a clamping member mounted on said support, and means for actuating said clamping member.

4. A work holder having, in combination, a body provided with a longitudinal bore for receiving a work blank and with a transverse hole opening into one side of said bore, a support secured to said body, said support having a pair of depressions in its outer surface, a clamping member positioned to engage said work blank, a pair of screws rigidly secured to said clamping member and extending through said support into said depressions, spring means positioned in said depressions for moving said screws and said clamping member outwardly, and adjustable means in said support engaging said clamping member for moving the latter inwardly.

5. A work holder having, in combination, a body provided with a bore for receiving a work blank and with a transverse hole opening into one side of said bore, an annular shoulder formed on said body at one end of said bore to locate the work blank endwise, a plate pivotally mounted at the other end of said bore, a latch means for holding said plate in closed position directly across the adjacent end of said bore, clamping means adjustably carried by said plate for engaging the adjacent end of said work blank to clamp the latter in position against said shoulder, and means for actuating said clamping means to clamp the work blank rigidly against said shoulder.

6. A work holder having, in combination, a body provided with a longitudinal bore and with a hole opening into said bore, means formed on said body for locating a work blank endwise in said bore, a clamping plate at one end of said bore, means for securing said plate in closed position directly across said bore, a clamping member mounted on said plate, spring means for moving said clamping member against said plate, and means for moving said clamping member from said plate into engagement with one end of said work blank.

7. A work holder having, in combination, a body provided with a bore for receiving a work piece and a pair of transverse holes opening into opposite sides of said bore, a notch means formed at one side of said body concentric with said holes, centering means formed on said body next to said notch and concentric with said holes, and work clamping means mounted on said body.

In testimony whereof we have hereunto affixed our signatures.

KEITH F. GALLIMORE.
RAYMOND M. WOYTYCH.